United States Patent
Ganiaris

[11] 3,803,861
[45] Apr. 16, 1974

[54] CRYSTALLIZATION CONCENTRATION PROCESS

[76] Inventor: Neophytos Ganiaris, 3671 Hudson Manor Ter., Riverdale, N.Y. 10463

[22] Filed: June 2, 1971

[21] Appl. No.: 149,387

Related U.S. Application Data

[60] Division of Ser. No. 642,467, May 31, 1967, abandoned, which is a continuation-in-part of Ser. No. 512,365, Dec. 8, 1965, abandoned, which is a continuation-in-part of Ser. No. 321,020, Nov. 4, 1963, Pat. No. 3,283,522.

[30] Foreign Application Priority Data
June 8, 1967 Germany.............................. 1619814
June 14, 1966 Great Britain..................... 26379/66

[52] U.S. Cl.......................... 62/123, 62/58, 99/71, 99/192, 99/199 C, 99/236 C

[51] Int. Cl............................................. B01d 9/04
[58] Field of Search.......... 62/58, 123, 124; 99/192, 99/199 C, 236, 71

[56] References Cited
UNITED STATES PATENTS

| | | | |
|---|---|---|---|
| 3,285,022 | 11/1966 | Pike | 62/58 |
| 2,647,059 | 7/1953 | Wenzelberger | 62/123 |
| 1,636,890 | 7/1927 | Zorn | 62/123 |
| 3,347,058 | 10/1967 | Svanoe | 62/53 |

Primary Examiner—Meyer Perlin
Assistant Examiner—Ronald C. Capossela

[57] ABSTRACT

After crystallization, a fluid-crystal slurry is concentrated in a filter before a more final crystal separation in a centrifuge.

1 Claim, 3 Drawing Figures

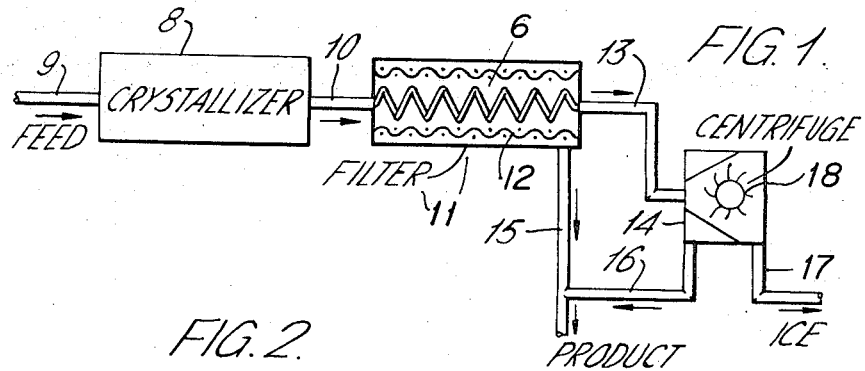
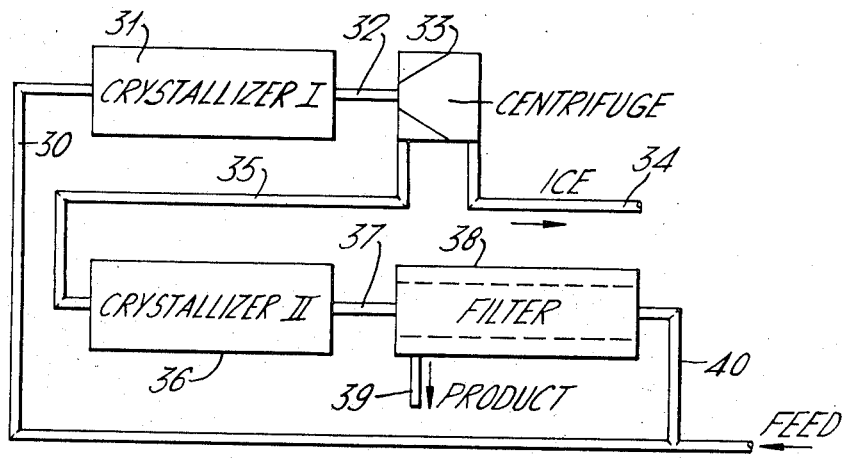
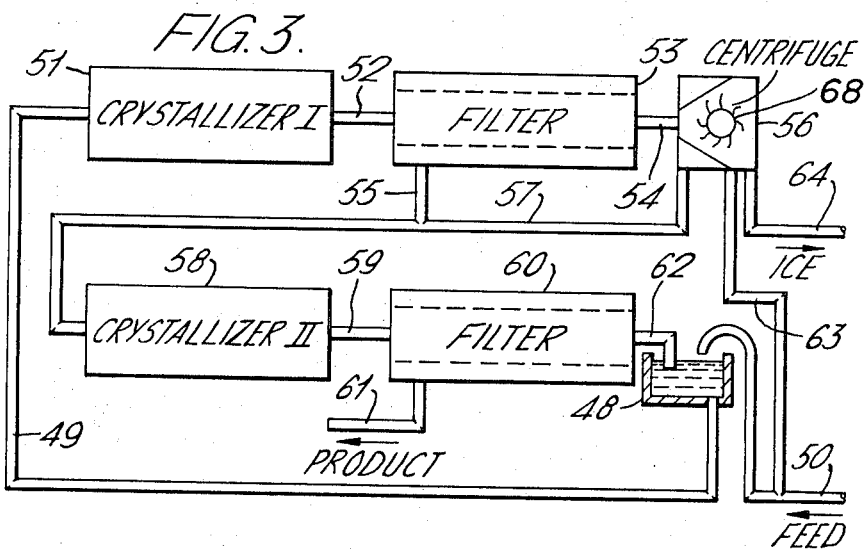

CRYSTALLIZATION CONCENTRATION PROCESS

This Application is a division of Ser. No. 642,467 filed May 31, 1967, which is a continuation-in-part of Ser. No. 512,365 filed Dec. 8, 1965, and forfeited on June 20, 1969, which in turn is a continuation-in-part of Ser. No. 321,020 filed Nov. 4, 1963 and now U.S. Pat. No. 3,283,522 of Nov. 8, 1966.

BACKGROUND OF INVENTION

Centrifuges are costly to provide and operate to separate ice or other crystals from solution. Further, centrifuges may produce undesirable foam and destroy the flavor of certain food products. For example, in the separation of ice crystals from coffee extract, the conventional use of one or more centrifuges gives rise to undesirable foaming. In ice crystal separation from beer, the conventional use of one or more centrifuges breaks down the taste of the beer concentrate. This invention provides for the more efficient use of centrifuges in these and other processes.

SUMMARY OF THE INVENTION

This invention provides for the efficient operation of a crystallizer which best produces desirable uniform ice crystals at a 20 to 30 percent concentration in a solution. A centrifuge operates most efficiently with closer to an 80 percent concentration of ice crystals to produce less foam and abuse of flavor. Thus, this invention concentrates a fluid-crystal slurry leaving a crystallizer by means of a filter so that a centrifuge may be efficiently employed. The process of this invention more effectively separates ice crystals from solutions of certain food products.

BRIEF DESCRIPTION OF THE DRAWINGS

FIG. I is a diagram showing the use of a filter in connection with a centrifuge to avoid foaming in the removal of ice crystals from a solution of coffee extract;

FIG. II is a diagram showing apparatus for the freeze concentration of coffee extract according to this invention; and FIG. III is a diagram showing the use of filters in apparatus for the freeze concentration of beer which does not impair the beer concentration flavor.

DESCRIPTION OF THE PREFERRED EMBODIMENTS

FIG. 1 shows a pipe 9 conducting a coffee solution to crystallizer 8 from which pipe 10 conducts an ice crystal and coffee solution slurry to filter 11. For the most efficient operation of crystallizer 8, this slurry would contain about 25 to 35 percent ice by weight. Filter 11 is of the screw fed or any other type and has filter elements 12 of screen containing openings from 0.008 inch to 0.015 inch across. Pipe 13 conducts an ice crystal and coffee solution slurry from filter 11 to centrifuge 14 containing an ice washing spray 18. This slurry contains 50 to 80 percent ice crystals by weight. Coffee solution from filter 11 flows through pipe 15 as a product and is joined by coffee solution flowing through pipe 16 from centrifuge 14. Ice removed from solution by centrifuge 14 passes from the system through pipe 17. Ice crystals removed from a concentrated coffee solution by centrifuge 14 have a relatively small amount by weight of coffee solids adhering to them in solution. Any suitable centrifuge 14 may be used to separate the ice crystals from solution, but the use of filter 11 to raise the ice crystal concentration by weight in the slurry to over 50 percent will substantially avoid foaming in centrifuge 14.

FIG. II shows a 20 percent coffee extract feed introduced through pipe 30 to enter crystallizer 31 which may be of any conventional type. The ice crystal and coffee solution slurry formed in crystallizer 31 passes through pipe 32 to enter centrifuge 33. Ice crystals from this centrifuge 33 pass from the system through pipe 34. Concentrated coffee extract passes from centrifuge 33 through pipe 35 to crystallizer 36. Ice crystals and a further concentrated coffee solution slurry pass from crystallizer 36 though pipe 37 to filter 38 which is of any suitable type as is the filter described in connection with FIG. 1. A coffee solution product is drawn from filter 38 through pipe 39. Ice crystals and adhering coffee solution pass from filter 38 through pipe 40 to be introduced into feed pipe 30 and recycled through the system.

If the ice crystals from filter 38 do not melt in feed pipe 30, they may be introduced into a feed tank (not shown) to melt before entering crystallizer 31. The ice leaving a centrifuge in a system such as this may have a coffee solids content of above 10 percent by weight. The ice leaving a filter 38 will have a coffee solids content of from 10 to 16 percent by weight depending on the product concentration. The great advantage which results from using a filter 38 rather than a centrifuge is that the product leaving through pipe 39 is completely free of foam. In addition, a filter 38 costs about one quarter as much as a centrifuge of equivalent capacity.

FIG. III shows beer being introduced through pipe 50, crystal melt tank 48, and pipe 49 into crystallizer 51. A concentrated beer and ice crystal solution passes through pipe 52 into filter 53 from which ice crystals and adhering beer concentrate pass through pipe 54 into centrifuge 56. Concentrated beer flows from filter 53 through pipe 55 to mix with beer concentrate separated from ice crystals by centrifuge 56 which flows through pipe 57.

Pipe 57 conducts the beer concentrate to crystallizer 58 where it is further concentrated and passes as an ice crystal containing slurry through pipe 59 to filter 60. A concentrated beer product stream is drained from filter 60 by pipe 61. Ice crystals and adhering beer concentrate from filter 60 pass through pipe 62 to be mixed with feed in crystal melt tank 48. An ice crystal washing spray 68 from centrifuge 56 passes through the pipe 63 to also mix with feed in pipe 50. Ice crystals leave centrifuge 56 and the system through pipe 64.

This arrangement avoids the mechanical abusing of concentrated beer liquor in a centrifuge which destroys its delicate flavor. Using this invention, only a relatively small amount of beer passes through the centrifuge 56 so that the taste and flavor of the product will not be degraded.

The apparatus and process of FIG. III may also be used to concentrate coffee solutions. It has been found that dropping ice crystals into a coffee solution from even a moderate height will produce considerable foaming. Thus filter 60 should pass ice crystals directly into melt tank 48 from a minimum height to reduce the possibility of foaming.

What is claimed is:

1. An apparatus system for liquid aqueous coffee concentration comprising the combination of:

means conducting coffee solution to an ice forming crystallizer;

an ice forming crystallizer means conducting a slurry of ice in coffee from said crystallizer to a screen separator;

a screen separator containing screen openings from 0.008 to 0.015 inches across;

means conducting a slurry of ice in liquid coffee solution from said separator to a centrifuge;

means conducting filtered coffee from said separator;

an ice separation centrifuge including an ice washing spray for separating ice from concentrated liquid coffee; and means to remove ice and coffee separately from said centrifuge.

* * * * *